Nov. 28, 1950   A. E. CLARK   2,532,058
DRILL AND REAMER HOLDER
Filed Jan. 9, 1947   2 Sheets-Sheet 1
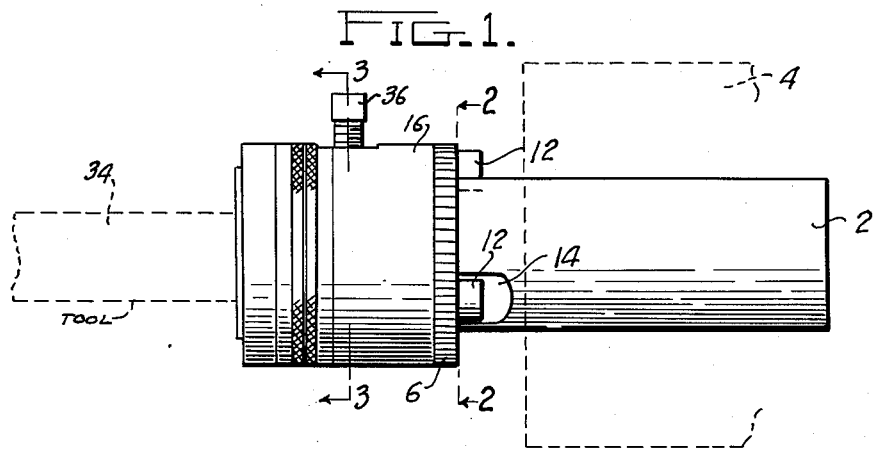
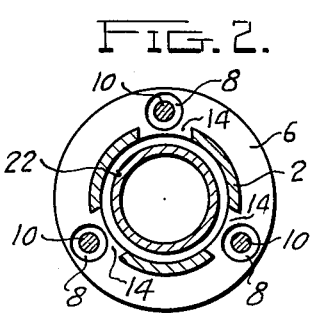
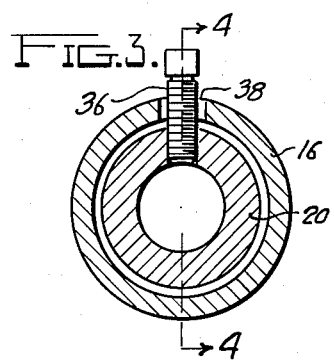
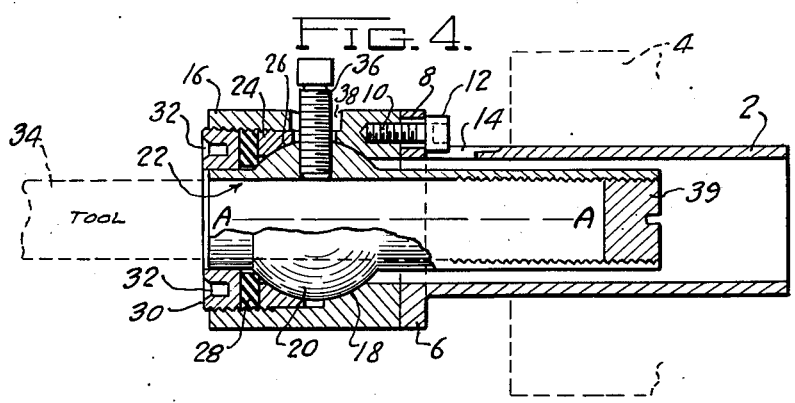
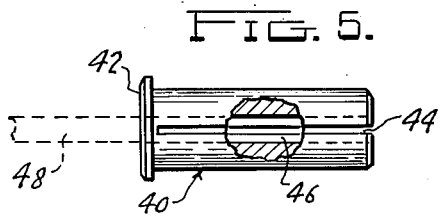
INVENTOR.
Arthur Edwin Clark
BY Hauke & Hardesty
ATTORNEYS Nov. 28, 1950     A. E. CLARK     2,532,058
DRILL AND REAMER HOLDER
Filed Jan. 9, 1947     2 Sheets-Sheet 2
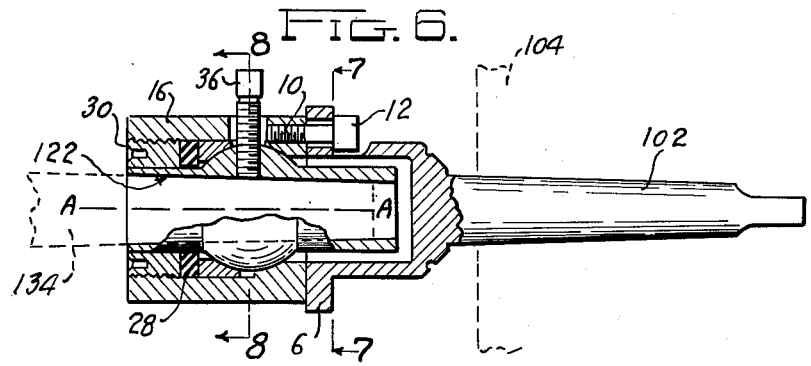
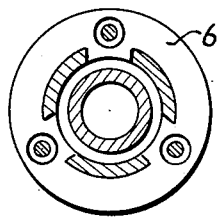
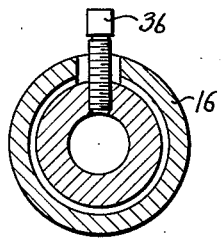
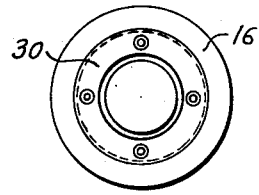
INVENTOR.
*Arthur Edwin Clark*
BY *Hauke & Hardesty*
ATTORNEYS Patented Nov. 28, 1950

2,532,058

UNITED STATES PATENT OFFICE 2,532,058

DRILL AND REAMER HOLDER

Arthur Edwin Clark, Ferndale, Mich.

Application January 9, 1947, Serial No. 721,019

3 Claims. (Cl. 279—16)

This invention relates to a tool mount.

In the machining of various materials, it is often desirable to have the cutting tool oriented with a certain center line. In some applications, as in lathes, that part of the machine which holds the cutting tool becomes so worn that proper alignment of the tool becomes difficult or very nearly impossible.

It is an object of this invention to provide a cutting tool mount which permits adjustment of the tool in its mount even though the mount itself be not adjustable in its holding device on the machine. This and other objects are accomplished in a cutting tool mount which incorporates a ball and socket joint to give limited universal adjustment of the cutting tool, and which also permits adjustment of the cutting tool in a plane which is generally transverse of the principal axis of the tool.

In the drawings:

Fig. 1 is a side elevation view of the tool mount made according to the invention.

Fig. 2 is a view in section substantially on line 2—2 of Fig. 1.

Fig. 3 is a view in section substantially on line 3—3 of Fig. 1.

Fig. 4 is a view in section substantially on line 4—4 of Fig. 3.

Fig. 5 is a detail view of an additional element which may be used as a part of the invention.

Fig. 6 is a longitudinal sectional view similar to Fig. 4, but showing another embodiment of the invention.

Fig. 7 is a view in section substantially on line 7—7 of Fig. 6.

Fig. 8 is a view in section substantially on line 8—8 of Fig. 6.

Fig. 9 is a front end elevation view of the embodiment shown in Fig. 6.

Referring now in detail to the drawings, a support 2 is shown as being held by any suitable machine tool holding device indicated in dotted lines at 4. The device 4 may be the tailstock of a lathe, or it may be the turret of a turret-head lathe, or it may be part of a screw-machine, or the like. The support 2 is provided with a flange 6. Flange 6 has openings 8 therein; as is best seen in Figs. 2 and 4, openings 8 are larger than the threaded portions 10 of screws having heads 12. The heads 12 of the screws are larger than the holes 8. Support 2 is preferably cut away or recessed as shown at 14 to accommodate screw heads 12.

The threaded portions 10 of the screws engage and support a body member 16. Body member 16 is hollow and has a concave substantially spherical shoulder 18. Shoulder 18 engages a substantially spherical portion 20 of a tool holder indicated generally at 22.

A bearing member 24 is provided with a substantially spherical face 26 which bears against the spherical portion 20 of the tool holder. A resilient washer 28, which is preferably of rubber, is held in place against bearing member 24 by a retaining member 30. The retainer 30 is preferably a ring-form member having external threads which cooperate with internal threads in the member 16. One face of retainer 30 is preferably recessed as shown at 32 to receive appropriately shaped projections on a suitably designed wrench.

Tool holder 22 has a reference axis A—A as seen in Fig. 4. The reference axis A—A is normally coincidental with or parallel to the principal axis of a cutting tool shown in dotted lines at 34, and is generally perpendicular to the face of flange 6, although it will be evident from the drawing that some deviation from the perpendicular is permitted and is in fact intended and provided for by virtue of the ball and socket joint formed by the spherical portion 20, and the shoulder 18 and face 26.

The spherical portion 20 is drilled and tapped to receive a set screw 36 which is provided to engage the tool. Set screw 36 extends through an opening 38 in body member 16. Opening 38 is substantially larger than set screw 36 in order to allow limited freedom of movement or adjustability of tool holder 22 in the body member 16.

The tail end of tool holder 22 is preferably threaded to receive a nut 39. In some applications, it will be desirable to provide a nut such as is shown at 39 which may be screwed up tight against the end of the tool 34 to prevent the rearward displacement of the tool in the tool holder.

Fig. 5 shows a collet 40 having a flanged head 42 and a body which is slotted as shown at 44. Collet 40 is preferably provided with a substantially central opening 46 which is adapted to receive a piece of rod stock shown in dotted lines at 48.

It will be evident to those skilled in the art that collet 40 is adapted to be held in place in tool holder 22. Set screw 36 may be tightened against the bifurcated body portion of the collet in order to clamp tightly any piece of rod stock 48 which may be held by the collet.

The embodiment shown in Figs. 6–9 inclusive is similar to the embodiment shown in Figs. 1–4 inclusive, except that the support 102 in the second embodiment is provided with a tapered shank. In addition, the tool holder 122 shown in Fig. 6 is also tapered in order to receive the tapered shank 134 of the cutting tool.

It will, of course, be understood that a tapered shank support 102 could be used with a tool holder such as shown at 22 of the first embodiment, or that a tapered tool holder 122 could be used in the embodiment shown in Fig. 4.

Operation

In operation, the support 2 or 102 is secured in place in the machine tool. The tool is fastened in place in tool holder 22 or 122 by means of set screw 36. The reference axis A—A of the tool holder, and thereby the principal axis of the tool, are then properly aligned by adjusting the body member 16 on the flange 6 before screws 10 are tightened; with the reference axis A—A properly lined up, retainer 30 is screwed tight against the resilient washer 28.

I claim:

1. In a tool mount, a support having an axis which is oriented in the general direction of the axis of relative rotation of the work and the tool, a body member mounted on the support and being adjustable on the support in a direction substantially transverse of the aforesaid axis, a concave substantially spherical shoulder in the body member, a tool holder having a substantially spherical portion in engagement with the spherical shoulder, a bearing member having a substantially spherical face in contact with the spherical portion on the tool holder, and means to removably hold the bearing member in contact with the spherical portion on the tool holder.

2. In a tool mount, a support having an axis which is oriented in the general direction of the axis of relative rotation of the work and the tool, a body member mounted on the support and being adjustable on the support in a direction substantially transverse of the aforesaid axis, a concave substantially spherical shoulder in the body member, a tool holder having a substantially spherical portion in engagement with the spherical shoulder, means to hold a tool in the tool member, a bearing member having a substantially spherical face in contact with the spherical portion on the tool holder, and means to removably hold the bearing member in contact with the spherical portion on the tool holder.

3. In a tool mount, a support having an axis which is oriented in the general direction of the axis of relative rotation of the work and the tool, a body member mounted on the support and being adjustable on the support in a direction substantially transverse of the aforesaid axis, a tool holder mounted in the body member and being universally adjustable relatively thereto, and means to removably hold the tool holder in operating position in the body member.

ARTHUR EDWIN CLARK.

REFERENCES CITED

The following references are of record in the file of this patent:

UNITED STATES PATENTS

| Number | Name | Date |
|---|---|---|
| 1,502,116 | O'Connell | July 22, 1924 |
| 1,513,647 | Spiritus | Oct. 28, 1924 |
| 1,759,101 | Daniels | May 20, 1930 |
| 2,272,185 | Chittenden | Feb. 10, 1942 |
| 2,392,039 | Gideon | Jan. 1, 1946 |